United States Patent
Höglund et al.

(10) Patent No.: US 12,133,188 B2
(45) Date of Patent: Oct. 29, 2024

(54) METHODS AND APPARATUSES FOR USING PRECONFIGURED UPLINK RESOURCES IN A WIRELESS COMMUNICATION NETWORK

(71) Applicant: Telefonaktiebolaget LM Ericsson (publ), Stockholm (SE)

(72) Inventors: Andreas Höglund, Solna (SE); Gerardo Agni Medina Acosta, Märsta (SE); Tuomas Tirronen, Helsinki (FI); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 273 days.

(21) Appl. No.: 17/625,127

(22) PCT Filed: Jul. 6, 2020

(86) PCT No.: PCT/IB2020/056347
§ 371 (c)(1),
(2) Date: Jan. 6, 2022

(87) PCT Pub. No.: WO2021/005492
PCT Pub. Date: Jan. 14, 2021

(65) Prior Publication Data
US 2022/0322264 A1 Oct. 6, 2022

Related U.S. Application Data

(60) Provisional application No. 62/871,304, filed on Jul. 8, 2019.

(51) Int. Cl.
*H04W 56/00* (2009.01)
*H04W 72/23* (2023.01)

(52) U.S. Cl.
CPC ....... *H04W 56/0045* (2013.01); *H04W 72/23* (2023.01)

(58) Field of Classification Search
CPC ..... H04W 56/004–0055; H04W 72/21; H04W 72/23; H04W 72/232
See application file for complete search history.

(56) References Cited

U.S. PATENT DOCUMENTS 9,167,547 B2 * 10/2015 Suzuki .............. H04W 56/0005
9,635,527 B1 *  4/2017 Gupta  ..................... H04W 4/14
(Continued)

FOREIGN PATENT DOCUMENTS

CN      109196933 A     1/2019
CN      109964434 A     7/2019
(Continued)

OTHER PUBLICATIONS

Huawei, et al., "Discussion on PUR in Rel-16 eMTC", 3GPP Draft; R4-1906583, Reno, US, May 13-17, 2019, 1-3.
(Continued)

*Primary Examiner* — Brendan Y Higa
(74) *Attorney, Agent, or Firm* — Murphy, Bilak & Homiller, PLLC

(57) ABSTRACT

A wireless communication device (12) conditions its use of Preconfigured Uplink Resources (PUR), as preconfigured by a wireless communication network (16), on assessing the validity of a Timing Advance (TA) value used by the device (12) for controlling its uplink transmission timing. The device (12) maintains a timer (37) and deems the TA value to be invalid upon expiration of the timer (37). In an example case, a device (12) operating in idle mode performs a PUR-based transmission in dependence on the timer (37) not being expired. A radio network node (10) of the network (16) maintains a like timer (57), to maintain an awareness of
(Continued)

TA validity at the device (12) and, for example, sends an updated TA for the device (12) upon receiving a PUR-based transmission from the device (12). The device (12) and the node (10) may refresh their respective timers, in association with the TA update.

24 Claims, 10 Drawing Sheets

(56) References Cited

U.S. PATENT DOCUMENTS

| | | | |
|---|---|---|---|
| 2012/0218987 A1* | 8/2012 | Zhao | H04L 27/2657 370/350 |
| 2020/0107389 A1* | 4/2020 | Charbit | H04W 76/27 |
| 2020/0107396 A1* | 4/2020 | Wang | H04W 72/23 |
| 2021/0274526 A1* | 9/2021 | Shin | H04L 1/1896 |
| 2021/0410166 A1* | 12/2021 | Shrestha | H04L 1/1678 |
| 2022/0022265 A1* | 1/2022 | Selvaganapathy | H04L 1/1896 |
| 2022/0167385 A1* | 5/2022 | Takeda | H04W 72/23 |

FOREIGN PATENT DOCUMENTS

| | | |
|---|---|---|
| EP | 3914015 A1 | 11/2021 |
| WO | 2018128578 A1 | 7/2018 |
| WO | 2019032024 A1 | 2/2019 |

OTHER PUBLICATIONS

ASUSTeK, "Discussion on TA Timer for D-PUR", 3GPP Draft, R2-1906551, (Resubmission of R2-1903709), Reno, USA, May 13-17, 2019, 1-3.

3GPP, "3GPP TS 36.321 V15.6.0", 3rd Generation Partnership Project; Technical Specification Group Radio Access Network; Evolved Universal Terrestrial Radio Access (E-UTRA); Medium Access Control (MAC) protocol specification (Release 15), Jun. 2019, 1-133.

3GPP, "3GPP TS 36.331 V15.2.2", 3rd Generation Partnership Project; Technical Specification Group Radio Access Network; Evolved Universal Terrestrial Radio Access (E-UTRA); Radio Resource Control (RRC); Protocol specification (Release 15), Jun. 2018, 1-791.

3GPP, "3rd Generation Partnership Project; Technical Specification Group Radio Access Network; Evolved Universal Terrestrial Radio Access (E-UTRA); Physical layer; Measurements (Release 15)", TS 36.214 V15.3.0, Sep. 2018, 1-25.

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.6.0, Jun. 2019, 1-960.

"Consideration for preconfigured uplink resources (PUR)", 3GPP TSG RAN WG1 Meeting #96, R1-1904747, Sequans Communications, Xi'An, China, Apr. 8-12, 2019, 6 pages.

* cited by examiner

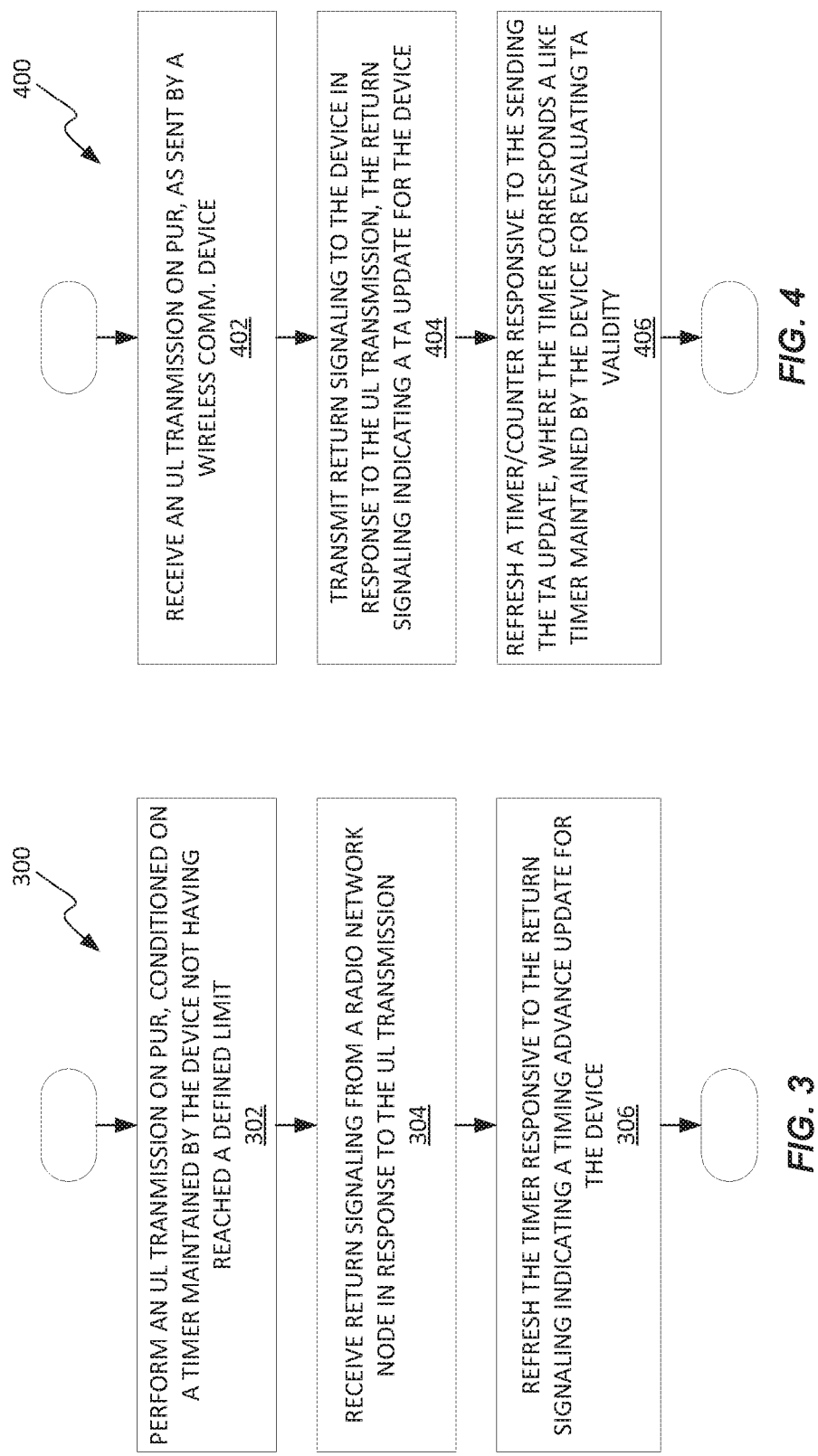

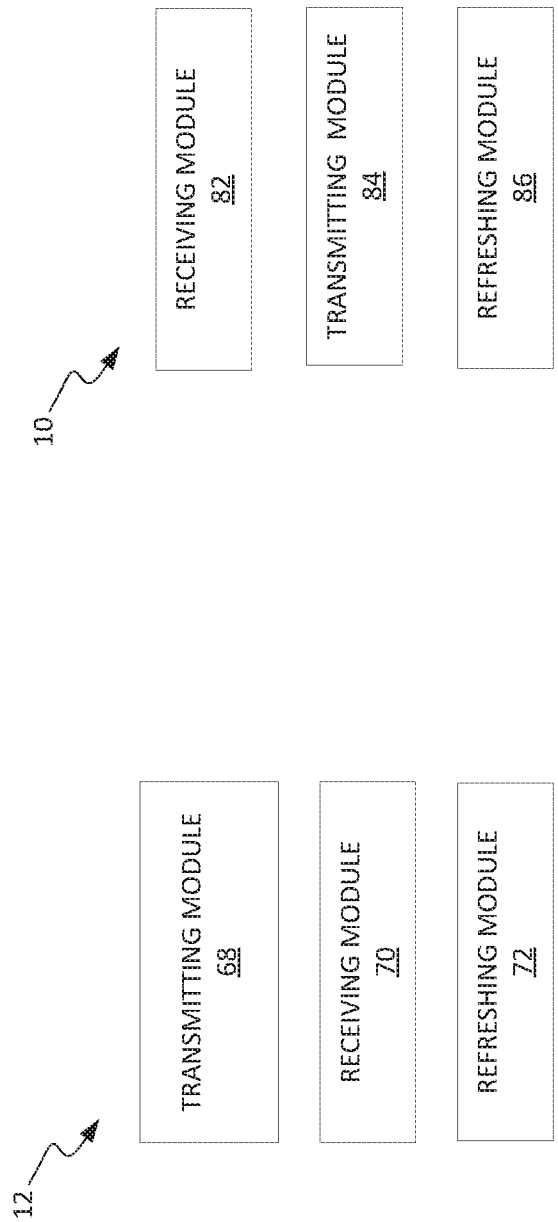

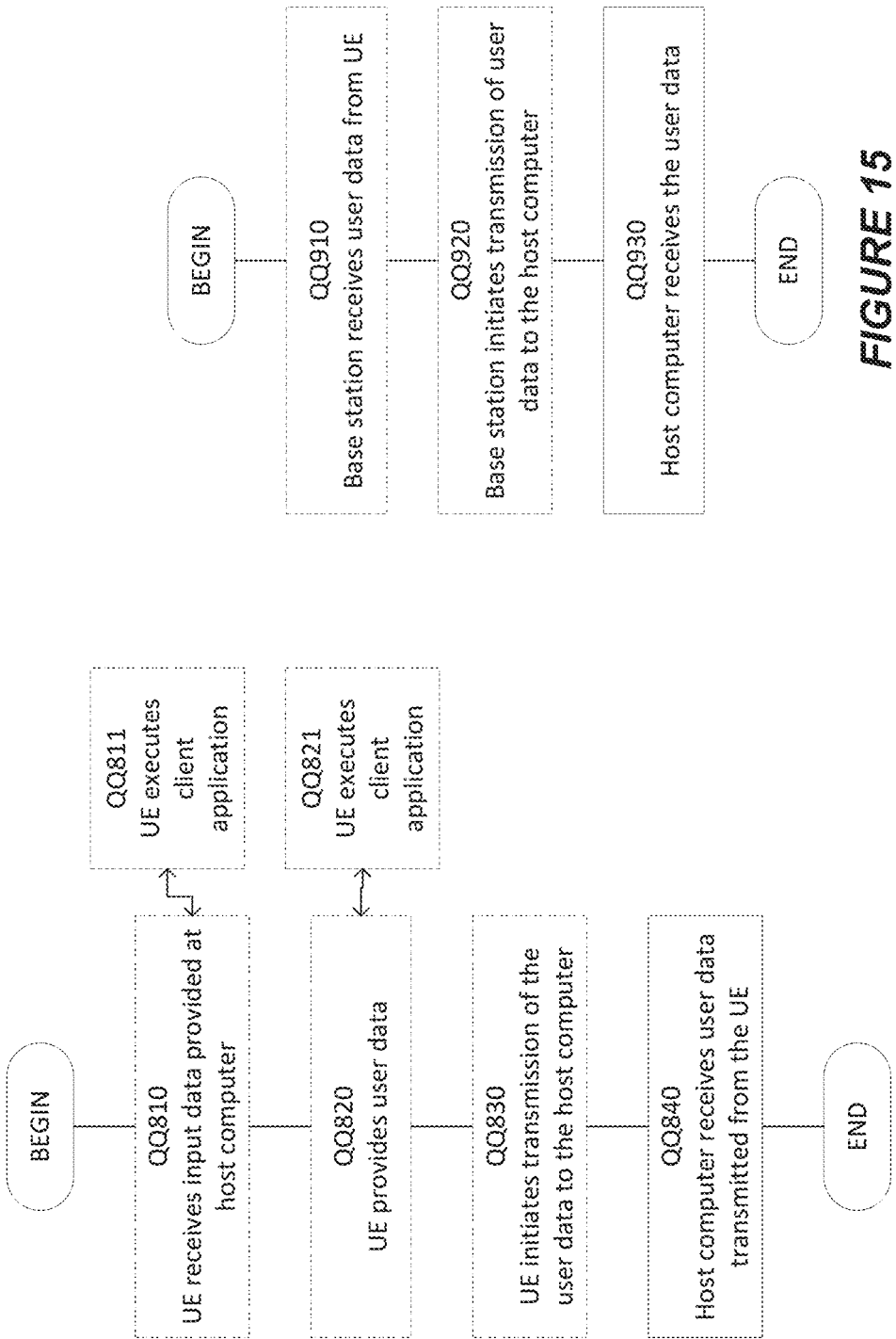

METHODS AND APPARATUSES FOR USING PRECONFIGURED UPLINK RESOURCES IN A WIRELESS COMMUNICATION NETWORK

TECHNICAL FIELD

The present description relates to wireless communication networks and particularly relates to the use of Preconfigured Uplink Resources (PUR) by a wireless communication device, such as a User Equipment (UE) operating in a wireless communication network configured according to standards promulgated by the Third Generation Partnership Project (3GPP).

BACKGROUND

Preconfigured Uplink Resources (PUR) may be preconfigured by a radio network node or other controlling entity for use by one wireless communication device, or by a group of devices, either on a contention-free or contention-based access. PUR offer opportunities for reducing signaling overhead, and the benefits may be significant for certain kinds of devices, such as Machine Type Communication (MTC) devices and Narrow Band Internet of Things (NB-IoT) devices. In a non-limiting example, such devices may send small amounts of data periodically, and allocating PUR for them saves the signaling overhead associated with allocating resources on a per-transmission basis using legacy procedures.

However, certain aspects associated with the implementation of PUR undo, at least partly, the expected reductions in signaling.

SUMMARY

Operations by a wireless communication device with respect to a wireless communication network include the device conditioning its use of Preconfigured Uplink Resources (PUR), as preconfigured by the network, on assessing the validity of a Timing Advance (TA) value used by the device for controlling its uplink transmission timing. In particular, there is one mechanism for validating the TA in which the device maintains a timer and deems the TA value to be invalid upon expiration of the timer. In an example case, a device operating in idle mode performs a PUR-based transmission in dependence on the timer not being expired. A radio network node of the wireless communication network maintains a like timer, to maintain an awareness of TA validity at the device and, for example, sends an updated. TA for the device upon receiving a PUR-based transmission from the device. The device and the node may refresh their respective timers, in association with the TA update.

In an example embodiment, a method performed by a wireless communication device operating in a wireless communication network includes performing an UL transmission on PUR, conditioned on a timer maintained by the wireless communication device not having reached a defined limit, where the wireless communication device refrains from further use of the PUR upon the timer reaching the defined limit. The method further includes the wireless communication device receiving return signaling from a radio network node in response to the UL transmission, and refreshing the timer responsive to the return signaling indicating a TA update for the wireless communication device.

In another example embodiment, a wireless communication device is configured for operation in a wireless communication network. The wireless communication device includes communication circuitry that includes receiver circuitry and transmitter circuitry. Further, the wireless communication device includes processing circuitry. The processing circuitry is configured to perform an UL transmission, via the communication circuitry, on PUR, conditioned on a timer maintained by the wireless communication device not having reached a defined limit, and where the wireless communication device refrains from further use of the PUR upon the timer reaching the defined limit. The processing circuitry is further configured to receive, via the communication circuitry, return signaling from a radio network node in response to the UL transmission, and refresh the timer responsive to the return signaling indicating a TA update for the wireless communication device.

A method in another example embodiment is performed by a radio network node of a wireless communication network. The method includes the radio network node receiving an UL transmission on PUR, the UL transmission sent from a wireless communication device. Further, the method includes the radio network node transmitting return signaling for the wireless communication device in response to the UL transmission, the return signaling indicating a TA update for the wireless communication device. Still further, the method includes the radio network node refreshing a timer responsive to sending the TA update, the timer maintained by the radio network node and matching a like timer maintained by the wireless communication device. In this context, the wireless communication device conditions its use of the PUR on the like timer by refraining from using the PUR upon the like timer reaching a defined limit, and it refreshes the like timer in response to the TA update.

In yet another example embodiment, a radio network node is configured for operation in a wireless communication network. The radio network node includes communication circuitry that includes receiver circuitry and transmitter circuitry. Further, the radio network node includes processing circuitry.

The processing circuitry of the radio network node is configured to receive, via the communication circuitry, an UL transmission on PUR, the UL transmission sent from a wireless communication device. Further, the processing circuitry is configured to transmit, via the communication circuitry, return signaling for the wireless communication device in response to the UL transmission, the return signaling indicating a TA update for the wireless communication device. Still further, the processing circuitry is configured to refresh a timer responsive to sending the TA update. The timer is maintained by the radio network node and matches a like timer maintained by the wireless communication device. In this context, the wireless communication device conditions its use of the PUR on the like timer by refraining from using the PUR upon the like timer reaching a defined limit, and it refreshes the like timer in response to the TA update.

Of course, the present description is not limited to the above features and advantages, Indeed, those skilled in the art will recognize additional features and advantages upon reading the following detailed description, and upon viewing the accompanying drawings.

BRIEF DESCRIPTION OF THE DRAWINGS

FIG. 3 is a logic flow diagram of one embodiment of a method performed by a wireless communication device.

FIG. 4 is a logic flow diagram of one embodiment of a method performed by a radio network node.

FIG. 5 is a block diagram of another embodiment of a wireless communication device.

FIG. 6 is a block diagram of another embodiment of a radio network node.

FIG. 14 is a flowchart illustrating a method implemented in a communication system, in accordance with one embodiment.

FIG. 15 is a flowchart illustrating a method implemented in a communication system, in accordance with one embodiment.

DETAILED DESCRIPTION

Figure 1:
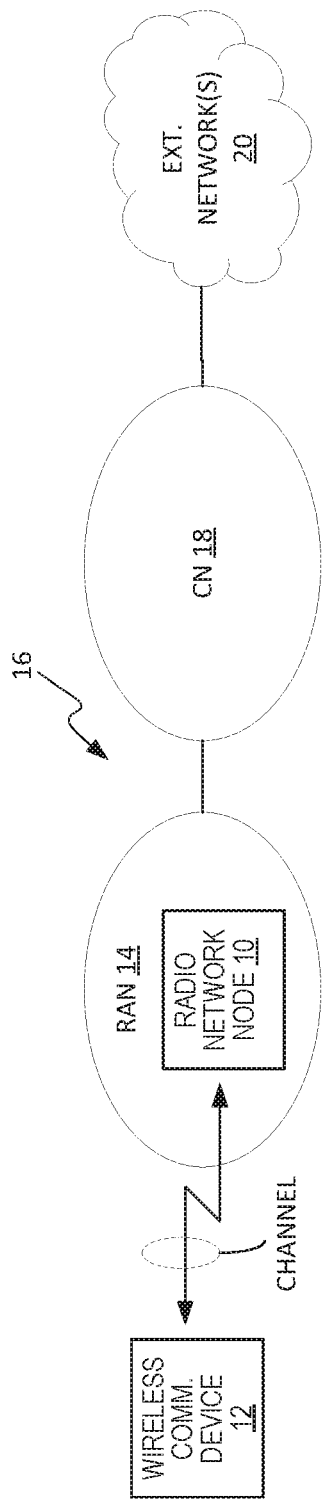
FIG. 1 is a block diagram illustrating one embodiment of a wireless communication network, shown in association with a wireless communication device and one or more external networks.

There has been a lot of work in 3GPP on specifying technologies to cover Machine-to-Machine (M2M) and/or Internet of Things (IoT) related use cases. Most recent work for 3GPP Release 13, 14 and 15 includes enhancements to support Machine-Type Communications (MTC) with new UE categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

The term "eMTC" herein refers to the LTE enhancements introduced in 3GPP Release 13, 14, and 15 for MTC, including (not limiting) support for bandwidth limited UEs, Cat-M1, and support for coverage enhancements. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were also introduced in Rel-13. The former, here referred to as UP-solution, allows the UE to resume a previously stored RRC connection (thus also known as RRC Suspend/Resume). The latter, here referred to as CP-solution, allows the transmission of user-plane data over NAS (also known as DoNAS).

There are multiple differences between "legacy" LTE and the procedures and channels defined for eMTC and for NB-IoT. Some important differences include a new physical channel, such as the physical downlink control channels, called MPDCCH in eMTC and NPDCCH in NB-IoT, and a new physical random access channel, NPRACH, for NB-IoT. Another important difference is the coverage level (also known as coverage enhancement level) that these technologies can support. By applying repetitions to the transmitted signals and channels, both eMTC and NB-IoT allow UE operation down to much lower SNR level compared to LTE, i.e., Es/Iot≥−15 dB being the lowest operating point for eMTC and NB-IoT which can be compared to Es/IoT≥−6 dB for "legacy" LTE.

The Rel-16 Work Item Descriptions for LTE-M and NB-IoT contain a common objective on improving the uplink transmission efficiency and/or UE power consumption by means of transmission in preconfigured resources. Work on improved UL transmission efficiency and/or UE power consumption includes specifying support for transmission in preconfigured resources in idle and/or connected mode based on SC-TDMA waveform for UEs with a valid timing advance, with this work implicating RAN1, RAN2, and RAN4. Both shared resources and dedicated resources may be involved, but the scheme may be limited to orthogonal (multi) access schemes.

Dedicated preconfigured uplink resources are from here on referred to as D-PUR. So far, it has been agreed that D-PUR in RRC Idle mode will be supported, and likely both with periodic configurations and configuration for one D-PUR transmission only, also known as "one-shot D-PUR."

As mandated by the WI-objective, the UE must have a valid timing advance (TA) for using PUR, and it has been agreed by RAN1 that one of the criteria for checking that TA is still valid is an Idle mode Timing Advance Timer (TAT). The TAT provides the UE with a mechanism for limiting how long it considers its current Timing Advance (TA) value to be valid. For example, during Connected Mode operation, the network updates the TA of the UE regularly or as needed. Once the UE transitions to Idle Mode, it considers the most recent TA received from the network to remain valid for the period defined by the TAT, with the TAT corresponding to the time elapsed from the UE's receipt of the most recent TA. Of course, the UE may further condition TA validity on cell signal strength, cell changes, etc.

As for agreed approaches in improving UL transmission efficiency and/or UE power consumption, it has been agreed that in Idle Mode, a UE will at least consider one or more of the following attributes when validating TA (combination of multiple attributes is allowed): (1) serving cell changes (serving cell refers the cell that the UE is camping on), (2) TAT for Idle Mode, and (3) serving cell RSRP changes (serving cell refers the cell that the UE is camping on and see Rel-15 TS36.214 for example measurements). Other attributes that may be considered include neighbor cell RSRP change, TDOA of >=2 eNBs, TA history, subscription-based UE differentiation, and attributes of interest for high-mobility UEs.

Thus, a UE can be configured to use as TA validation attributes, at least the TAT for Idle Mode and serving-cell RSRP changes, with support for disabling the TA validation attributes. Further, the TA validation configuration of a UE may include a "PUR TAT," where the UE considers its TA as invalid if the (current time—time of last TA update)>than the PUR TAT. There may be flexibility in specifying and configuring the PUR TAT. A UE may be configured such that it always considers its TA valid within a given cell, which may be regarded as setting the PUR TAT of the UE to infinity (no expiration).

More generally, however, the UE uses a non-infinite timer or counter mechanism to limit how long it considers its TA valid for use when transmitting on PUR. Herein, the term "timer/counter" denotes either a timer mechanism or a counter mechanism. An example timer mechanism, or, simply, "timer", counts up or down at a certain rate to track elapsed time and may be used to define a period over which the UE's last TA is deemed to valid. An example counter mechanism, or, simply, "counter", counts up or down, e.g., to a defined limit, and may be used to count events, such as "PUR occasions." As one example of a PUR occasion, the PUR allocation for a UE or group of UEs may involve periodically reoccurring uplink resources, with each reoccurrence constituting one PUR occasion.

Thus, whenever the timer/counter expires or reaches its defined limit, the UE deems its TA invalid and correspondingly does not transmit on the PUR. Consequently, the PUR would have to be reconfigured via RRC signaling, which undermines to some extent the reductions in signaling overhead gained from providing PUR.

One aspect of the techniques disclosed herein involves a UE refreshing the timer/counter it uses for assessing its TA validity with respect to performing an Uplink (UL) transmission on PUR, in response to the UE, receiving a TA update from the involved wireless communication network via Downlink Control Information (DCI). Refreshing the validity timer/counter based on TA updates received via control signaling sent from the network, e.g., in response to an UL transmission by the UE on the PUR, reduces signaling overhead by avoiding the need for reconfiguring PUR as a consequence of undesired timer/counter "expiration" at the UE. Here, the term "expiration" broadly denotes either or both expiry of a period timer or exhaustion of a counter—i.e., a counter reaching a defined count limit.

To appreciate some of the advantages gained by the above-described mechanism for refreshing the validity timer/counter used by the UE for assessing its TA validity with respect to performing an UL transmission on PUR hereafter, referred to simply as the UE's "timer/counter"—consider that in legacy operations, TA is provided to a UE, in the Random Access Response message in Msg2. Once the UE is in connected mode, the eNodeB keeps estimating TA for the UE and sends a TA Command MAC Control Element to the UE, if a correction (i.e., adjustment) is required.

In RAN2 an alternative fail-safe mechanism has been discussed, i.e., applying a PUR configured only to a number of n PUR occasions (after which PUR would have to be configured again). In one alternative embodiment, the above embodiments also apply to this case. That is, the counter for n (either counting up to n or down to zero depending on implementation) is reset upon a TA update. In the text below the counter may be referred to as a PUR occasion counter, for convenience.

For PUR, with the UE in RRC Idle mode, it is being discussed if it should be possible to update the TA during signaling for PUR transmission, e.g., L1 (ACK) or L2/L3 signaling. So far it has been discussed whether it should be possible to update the TA via DCI or through a fallback to legacy RA procedure, CP (Rel-13 DoNAS)/UP (RRC Suspend/Resume) procedure or Early Data Transmission (EDT) procedure.

One proposal of this disclosure is to refresh (e.g., reset) a UE's timer/counter to a configured value or defined starting value whenever TA is updated after an UL transmission over PUR. Such an approach allows the timer/counter to continue to serve its intended role as a failsafe mechanism for avoiding transmission on PUR with an outdated TA but allows the timer/counter to be refreshed in conjunction with a UE performing UL transmissions on its allocated PUR.

In at least one embodiment, the UE and the involved radio network node in the wireless communication network maintain like (matching) timer/counters for timing TA validity with respect to PUR-based transmissions by the UE. Such an approach allows the radio network node to track whether/when the TA at the UE times out (is deemed invalid). Correspondingly, when the TA is updated in DCI sent for the UE, the radio network node refreshes its copy of the timer/counter, and the UE does the same thing. One aspect of this joint restart or synchronization of timer/counter copies between the radio network node and the UE involves using an agreed timer for effecting the refresh. For example, the refresh may be performed in conjunction with the time of reception of the DCI or in conjunction with the first PUR occasion that follows.

In one contemplated scenario, the UE performs an UL transmission on PUR and the involved radio network node successfully receives the UL transmission. (Here, the involved radio network node may be a serving radio base station on which the UE performs Idle-Mode camping.) In response to its successful reception of the UL transmission, the radio network node transmits an "L1-ACK" for the UE, with the transmission including a TA update in the DCI (e.g., DCI Format 6-0A or DCI Format 6-0B for MTC, and DCI Format N0 for NB-IoT). In response to receiving the TA update, the UE refreshes its timer/counter, which, again, may be a PUR TAT or a PUR occasion counter. The refresh occurs at the agreed or predefined time. For example, the UE may refresh its timer/counter upon reception of the TA update, or at the next PUR occasion. Similarly, the radio network node refreshes its copy of the UE's timer/counter, so that it maintains an awareness of whether/when the TA at the UE becomes stale with respect to transmissions by the UE on the PUR.

In another contemplated example, in the case of an unsuccessful PUR transmission and upon the reception of an "UL Grant" containing a TA update in the DCI (e.g., DCI Format 6-0A or DCI Format 6-0B for MTC, and DCI Format N0 for NB-IoT), the UE will refresh (e.g., re-start) its timer/counter. Again, the involved radio network node may also refresh its like timer.

In another example, upon the UE having received either an "L1-ACK" or an "L2-ACK" or an "UL Grant" from the radio network node, the re-start of timer/counter at the UE becomes effective at a defined point in time (e.g., a number of milliseconds after the reception of the "ACK" or "UL Grant"). The radio network node may configure the defined point in time or the UE, and the radio network node otherwise exchange handshake signaling for agreement on the defined time, so that both the UE and the radio network node can synchronize refreshing of their respective copies of the timer/counter.

In one or more example implementations or scenarios, if PUR is configured for a scenario in which the TA is always valid within a cell (e.g., in a small cell scenario), the timer/counter is not re-started upon the UE having received either an "L1-ACK" or an "L2-ACK" or an "UL Grant".

In another example implementation or scenario, irrespective of the scenario where PUR is to be used, the possibility of re-starting the timer/counter upon the UE having received either an "L1-ACK" or an "L2-ACK" or an "UL Grant" is configurable by the network.

In another example implementation or scenario, when the TA is updated via RA/EDT procedure, the TA timer/PUR occasion counter is restarted in both the UE and the radio network node. A joint restart time would be agreed, e.g., the time of the reception of the Random Access Response (RAR) in Msg2, the time of the first PUR occasion that follows. This embodiment also applies to any truncated RA/EDT procedure, which would be used just to obtain a new TA, which has been discussed in 3GPP.

In another example implementation or scenario, if TA is updated via L1 signaling, e.g., via DCI, the UE confirms to the radio network node that the timer/counter at the UE has been refreshed. Refresh confirmation from the UE is not needed if the network provides the TA update to the UE via L2/L3 signaling (e.g., RRC signaling), because such signaling involves acknowledgment feedback from the UE, which can be used for synchronizing the timer/counter refreshes at the UE and the radio network node.

As another example, the UE may be configured to provide the refresh confirmation during the next PUR transmission occasion, where the confirmation indication may be explicit or implicit. Similarly, in at least one embodiment, if the UE establishes a connection before the next PUR occasion, it provides the confirmation indication (implicitly or explicitly) in association with establishing the connection. Examples of connection mechanisms include legacy Random Access (RA) procedures, DoNAS or RRC Suspend/Resume, or Early Data Transmission (EDT).

FIG. 1 depicts a radio network node 10 and a wireless communication device 12. The radio network node 10 is associated with a Radio Access Network, RAN, 14 of a wireless communication network 16. The RAN 14 along with a Core Network, CN, 18 forms the wireless communication network 16, which may include further nodes not explicitly shown in the diagram. The network 16 provides communication services to the wireless communication device 12, e.g., by operatively connecting it to one or more external networks 20, such as the Internet.

In a non-limiting example, the network 16 comprises Wide Area Access Network or WAN, e.g., a cellular network based on 3GPP specifications. Example implementations include LTE-based (4G) implementations, as well as 5G implementations involving the New Radio, NR, interface. Using 4G or 5G nomenclature, the radio network node 10 comprises an "eNB" or "gNB," which is a type of radio-network base station. The wireless communication device 12 comprises essentially any type of wireless communication apparatus that includes the wireless interface circuitry and corresponding security and protocol support necessary for accessing the network 16 via the provided air interface(s). Unless noted otherwise, the terms "User Equipment," "UE," and "wireless communication device" are used interchangeably.

In one or more example embodiments, the radio network node 10 is configured to carry out the network-side operations described above and herein. Alternatively, in at least one embodiment, another network node, such as a centralized network node or a cloud-implemented processing node, performs at least some of the network-side operations described above and herein. In one or more example embodiments, the wireless communication device 12 is configured to carry out the device-side operations described above and herein.

Figure 2:
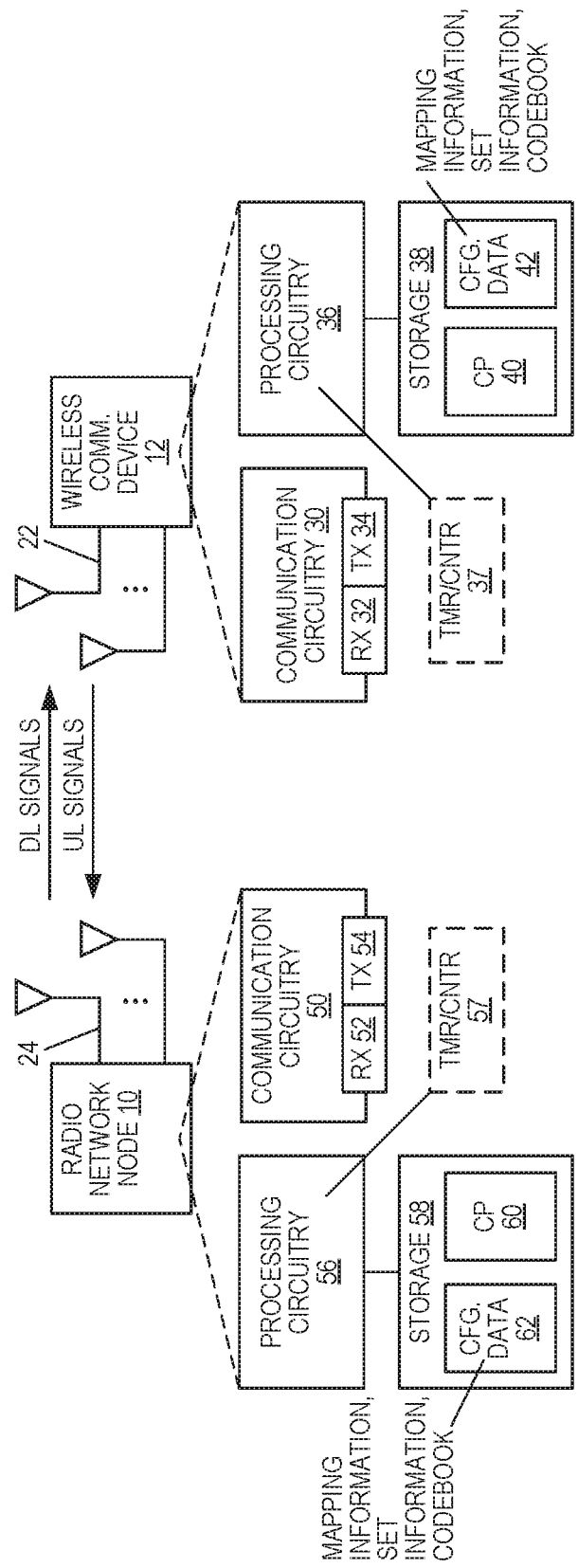
FIG. 2 is a block diagram of example embodiments of a wireless communication device and a radio network node of a wireless communication network.

FIG. 2 illustrates further example details for the wireless communication device 12 and the radio network node 10. While such details may be advantageous in certain scenarios or use-cases, they are non-limiting with respect to the functionality described herein.

The wireless communication device 12 in the illustrated example implementation includes one or more antennas 22, and the radio network node 10 includes a potentially large number of antennas 24, for receiving and/or transmitting. Here, the term "antenna" will be understood as encompassing "antenna elements," such as where the radio network node 10 includes one or more arrays of antenna elements, e.g., for beamforming.

According to further example details, the wireless communication device 12 includes communication circuitry 30 that provides physical-layer connectivity for transmitting and receiving communication signals from the antenna(s) 22. As an example, the communication circuitry 30 includes receiver circuitry 32 and transmitter circuitry 34 configured for cellular or other radio communications, according to the air interface standards and associated signaling protocols used by the network 16. The communication circuitry 30 may include further circuits, e.g., supporting BLUETOOTH, WIFI, or other local connectivity, and the wireless communication device 12 may also support Device-to-Device (D2D) communications.

Further componentry includes processing circuitry 36, which, in at least some embodiments, includes or is associated with storage 38. The processing circuitry 36 comprises fixed circuitry, programmed circuitry, or a mix of fixed and programmed circuitry. Functionally, the processing circuitry 36 may perform at least some baseband processing associated with transmitting and receiving signals via the communication circuitry 30. The processing circuitry 36 may also be configured to provide overall communication and control processing, etc.

The processing circuitry 36 comprises, for example, one or more microprocessors, digital signal processors, application specific integrated circuits, field programmable gate arrays, or other digital processing circuits. In at least one embodiment, the processing circuitry 36 comprises at least one processor and a memory storing a computer program comprising program instructions for execution by the at least one processor, whereby the at least one processor is configured to cause the wireless communication device 12 to operate as described herein.

Thus, the storage 38 may comprise one or more types of computer-readable memory providing non-transitory storage for a computer program 40 (abbreviated as "CP" in the diagram), for execution by a processor of the wireless communication device 12. The storage 38 may store other information, such as one or more items of configuration data 42 (abbreviated in "CFG. DATA" in the diagram). The configuration data 42 may include, for example, data defining the agreed-upon time(s) for refreshing the UE's validity timer/counter in response to receiving a TA update via downlink control signaling.

Notably, "non-transitory" does not necessarily mean permanent or unchanging storage but the term does connote storage of at least some persistence. In this regard, the storage 38 may include program memory or storage and working memory or storage, with the former being non-volatile and the latter being volatile. Non-limiting examples include any one or more of FLASH, EEPROM, SRAM, and DRAM circuitry and/or electromagnetic or solid-state disk storage.

Similar details apply to the radio network node 10, although it may have more complexity and operate at higher power as compared to the wireless communication device 12, and it may include various computer or network interfaces not seen in the wireless communication device 12, for interfacing with other nodes or systems in the network 16. Broadly, however, the radio network node 10 includes communication circuitry 50, which provides physical-layer connectivity for transmitting and receiving communication signals from the antennas 24. As an example, the communication circuitry 50 includes receiver circuitry 52 and transmitter circuitry 54 configured for cellular or other radio communications, according to the air interface standards and associated signaling protocols used by the network 16. Such circuitry may be implemented in resource pools or other plural configurations for use in supporting connections and associated processing for relatively large numbers of wireless communication devices.

Further componentry includes processing circuitry 56, which, in at least some embodiments, includes or is associated with storage 58. The processing circuitry 56 comprises fixed circuitry, programmed circuitry, or a mix of fixed and programmed circuitry. Functionally, the processing circuitry 56 may perform at least some baseband processing associated with transmitting and receiving signals via the communication circuitry 50. The processing circuitry 56 may also be configured to provide overall communication and control processing, etc.

The processing circuitry 56 comprises, for example, one or more microprocessors, digital signal processors, application specific integrated circuits, field programmable gate arrays, or other digital processing circuits. In at least one embodiment, the processing circuitry 56 comprises at least one processor and a memory storing a computer program comprising program instructions for execution by the at least one processor, whereby the at least one processor is configured to cause the radio network node 10 to operate as described herein.

Thus, the storage 58 comprises one or more types of computer-readable memory providing non-transitory storage for a computer program 60 (abbreviated in "CP"), for execution by a processor of the radio network node 10. The storage 58 may store other information, such as one or more items of configuration data 62 (abbreviated as "CFG. DATA"). Notably, "non-transitory" does not necessarily mean permanent or unchanging but does connote storage of at least some persistence. In this regard, the storage 58 may include program memory or storage and working memory or storage, with former being non-volatile and the latter being volatile. Non-limiting examples include any one or more of FLASH, EEPROM, SRAM, and DRAM circuitry and/or electromagnetic or solid-state disk storage.

In the above description, and elsewhere in the specification, references to items, entities, or components in the singular do not exclude the possibility of plural implementations, unless noted. For example, references to "a processor" are not limited to single-processor implementations and broadly encompass implementations using plural processors operating cooperatively for various ones of the involved functions. Similarly, references to "a node," such as "the radio network node 10", do not exclude multi-node or distributed implementations.

With the example details of FIG. 2 in mind, a wireless communication device 12 is configured for operation in a wireless communication network 16 that includes a radio network node 10. The wireless communication device 12 includes communication circuitry 30 configured for transmitting signals to and receiving signals from the radio network node 10 and processing circuitry 36 that is operatively associated with the communication circuitry 30.

The processing circuitry 36 in at least some embodiments is configured to (a) perform an Uplink (UL) transmission on Preconfigured Uplink Resources (PUR), conditioned on a timer/counter maintained by the device not having reached a defined limit, wherein the device refrains from further use of the PUR upon the timer/counter reaching the defined limit; (b) receive return signaling from a radio network node in response to the UL transmission performed; and (c) refresh the timer/counter responsive to the return signaling indicating a Timing Advance (TA) update for the device.

In one example, refreshing the timer/counter comprises resetting the timer/counter to a starting or configured value. In the same or another example, refreshing the timer/counter comprises refreshing the timer/counter at a defined time. The defined time may be a reception time of the return signaling or may correspond to a next PUR occasion.

The timer/counter in one or more example embodiments is a Timing Alignment Timer (TAT) used by the device in an Idle Mode of operation to limit the length of time over which the device considers a last-received TA value to be valid, at least with respect to performing UL transmissions on PUR. In another example, the timer/counter is an occasion counter that counts PUR occasions. FIG. 2 illustrates an example timer/counter 37, as implemented and operated within the wireless communication device 12. The timer/counter 37 may be a dedicated hardware unit or may be implemented in the processing circuitry 36 via the execution of computer-program instructions. A like or matching timer/counter 57 may be maintained in the radio network node 10 (which may maintain multiple timer/counter copies corresponding to respective ones among a plurality of wireless communication devices supported by the radio network node 10).

Receiving the return signaling comprises, in at least one example implementation or scenario, receiving Layer-1 network signaling transmitted by the node. Correspondingly, the method further includes the device 12 sending confirmation signaling, to confirm the refreshing of the timer/counter. In at least one example, the processing circuitry 36 is configured to send the confirmation signaling as an Ack to the Layer-1 network signaling.

The confirmation signaling may be sent at the next PUR occasion or upon a next connection by the device to the network, particularly when the next connection is in advance of the next PUR occasion. The confirmation indication may be explicit or implicit, and the radio network node 10 in one or more embodiments uses the confirmation as a trigger for refreshing its copy of the timer/counter (timer/counter 57 in FIG. 2). The return signaling sent from the network 16 to the wireless communication device 12 also may comprise receiving Layer-2 or Layer-3 network signaling, such as RRC signaling, and the device 10 may use the associated L2/L3 acknowledgment signaling to send the confirmation.

Further, in the example context of FIG. 2, the radio network node 10 is configured for operation in a wireless communication network 16 that includes the node 10. The radio network node 10 includes communication circuitry 50 configured for transmitting signals to and receiving signals from one or more wireless communication devices 10 and further includes and processing circuitry 56 that is operatively associated with the communication circuitry 30.

In one or more example embodiments, the radio network node 10 comprises: (a) communication circuitry 50 configured to transmit signals to and receive signals from a wireless communication device 12, along with processing circuitry 56 that is operatively associated with the communication circuitry 50. The processing circuitry 56 is configured to (a) receive an Uplink (UL) transmission on Preconfigured Uplink Resources (PUR), the UL transmission sent from a wireless communication device 12, (b) transmit return signaling for the device 12 in response to the UL transmission, the return signaling indicating a Timing Advance (TA) update for the device 12, and (c) refresh a timer/counter responsive to the TA update.

FIG. 2 illustrates an example timer/counter 57 in the node 10, where the timer/counter 57 comprises a purely hardware-based timer/counter or comprises a timer/counter implemented in the processing circuitry 56 via the execution of stored computer program instructions. In either case, the timer/counter maintained by the node matches a like timer/counter maintained by the wireless communication device 12. The device 12 conditions its use of the PUR on the like timer/counter by refraining from using the PUR upon the like timer/counter reaching a defined limit, and refreshes the like timer/counter in response to the TA update it receives from the node 10.

Refreshing the timer/counter at the node 10 comprises, for example, refreshing the timer/counter at a defined time. The defined time, for example, corresponds to transmission of the return signaling or corresponds to a next PUR occasion. Regardless of which time the timer/counter refresh is pinned to, the time should be mutually known between the radio network node 10 and the wireless communication device 12, so that the node 10 and the device 12 keep their respective copies of the timer/counter in sync.

In an example implementation or scenario, the return signaling sent from the node 10 to the device 12 comprises Layer-1 signaling. Correspondingly, the processing circuitry 56 is configured to condition the refreshing of the timer/counter maintained in the node 10 on receiving a confirmation from the device 12. Here, the confirmation in question implicitly or explicitly indicates that the device 12 has or will refresh its like timer/counter.

In another example implementation or scenario, the processing circuitry 56 is configured to transmit the return signaling as Layer-2 or Layer-3 network signaling. In at least one example, the node 10 conditions refreshing its copy of the timer/counter on receiving corresponding L2/L3 acknowledgment signaling from the device 12.

FIG. 3 illustrates a method 300 performed by a wireless communication device 12 configured for operation in a wireless communication network 16 that includes a radio network node 10. The method 300 may be performed by the wireless communication device 12 illustrated in FIG. 2, but the implementation of the method 300 is not limited to the example arrangement of circuitry depicted in FIG. 2.

The method includes the device 12 performing an UL transmission on Preconfigured Uplink Resources (PUR), conditioned on a timer/counter maintained by the device not having re ached a defined limit (Block 302). In this context, the device 12 refrains from further use of the PUR upon the timer/counter reaching the defined limit, and the limit may be represented as expiry of a running timer or reaching a defined count limit, e.g., a count defining the maximum number of PUR occasions over which the most recent TA value stored in the device 12 remains valid without the device 12 receiving a TA update.

The method 300 further includes the device 12 receiving return signaling from a radio network node in response to the UL transmission (Block 304) and refreshing the timer/counter responsive to the return signaling indicating a Timing Advance (TA) update for the device (Block 306). Here, refreshing the timer/counter comprises, for example, resetting the timer/counter to a configured value or to a default value, e.g., the defined starting value of the timer/counter. If the timer/counter is an incrementing running counter, refreshing it comprises, for example, resetting it to a starting count value. If the timer/counter is an incrementing counter having a corresponding defined maximum count, refreshing it comprises, for example, resetting it to a zero count or other starting value.

In a specific example implementation or context for the performance of the method 300, the device 12 is operating in Idle Mode and has an aging TA—i.e., the last TA provided to it by the network 16 is getting older or becoming stale. The device 12 determines whether its TA remains valid, at least with respect to a contemplated transmission of user data on PUR, by determining whether the timer/counter used by the device 12 for time-limiting the validity of the TA is exhausted (expired or reached its count limit).

If the TA is still valid per the timer/counter, the device 12 performs an UL transmission on the PUR, transmitting some or all of the user data available at the device 12—e.g., as held in an uplink transmission buffer of the device 12. A radio network node 10 receives the UL transmission on the PUR and transmits return signaling for the device 12, e.g., downlink control information. Assuming successful reception of the downlink control information at the device 12, if the downlink control information indicates a TA update for the device 12, the device refreshes the timer/counter, thereby extending the time before exhaustion of the timer/counter.

FIG. 4 illustrates a method 400 performed by a radio network node 10, e.g., an eNB or other base station, configured for operation in a wireless communication network 16 that includes the radio network node 10. The method 400 may be performed by the node 10 illustrated in FIG. 2, but the implementation of the method 400 is not limited to the example arrangement of circuitry depicted in FIG. 2.

The method includes the node 10 receiving an UL transmission on PUR (Block 402), where a wireless communication device 12 performs the UL transmission on the PUR, conditioned on a timer/counter maintained by the device 12 not having reached a defined limit. In this context, the device 12 refrains from further use of the PUR upon its timer/counter reaching the defined limit, and the limit may be represented as expiry of a running timer or reaching a defined count limit, e.g., a count defining the maximum number of PUR occasions over which the most recent TA value stored in the device 12 remains valid without the device 12 receiving a TA update.

The method 400 further includes the node 10 transmitting return signaling for the device 12, in response to receiving the UL, transmission (Block 404). The return signaling implicitly or explicitly indicates a TA update for the device 12. Correspondingly, the method 400 includes the node 10 refreshing a timer/counter maintained in the node 10, responsive to sending the TA update (Block 406). Here, refreshing the timer/counter in the node 10 comprises, for example, resetting the timer/counter to a configured value or to a default value, e.g., the defined starting value of the timer/counter. If the timer/counter in the node 10 is an incrementing running counter, refreshing it comprises, for example, resetting it to a starting count value. If the timer/counter in the node 10 is an incrementing counter having a corresponding defined maximum count, refreshing it comprises, for example, resetting it to a zero count or other starting value.

The timer/counter in the node 10 corresponds to the timer/counter maintained in the device 12. Keeping the node's timer/counter in sync with the timer/counter maintained in the device 12 allows the node 10 to know at a given time whether the device 12 considers its TA to be valid or invalid, at least with respect to a contemplated UL transmission by the device on PUR.

The device-based functions illustrated in the method 300 may be implemented via functional processing modules or units, e.g., realized as specially-adapted processing circuits, based on the execution of stored computer program instructions by one or microprocessors or other digital processing circuitry forming the processing circuitry 36 shown in FIG. 2 for the wireless communication device 12.

In the example embodiment illustrated in FIG. 5, the processing modules or units of the wireless communication device 12 comprise a transmitting module 68 that is configured to perform an UL transmission on PUR, conditioned on a timer/counter maintained by the device 12 not having reached a defined limit. The device 12 is configured to refrain from further use of the PUR upon the timer/counter reaching the defined limit.

The device 12 further includes a receiving module 70 that is configured to receive return signaling from a radio network node 10 in response to the UL transmission and a refreshing module 72 that is configured to refresh the timer/counter responsive to the return signaling indicating a TA update for the device 12.

Similarly, the node-based functions illustrated in the method 400 may be implemented via functional processing modules or units, e.g., realized as specially-adapted processing circuits, based on the execution of stored computer program instructions by one or microprocessors or other digital processing circuitry forming the processing circuitry 56 shown in FIG. 2 for the radio network node 10.

In the example embodiment illustrated in FIG. 6, the node 10 comprises a receiving module 82 that is configured to receive an UL transmission on PUR, where the UL transmission is sent from a wireless communication device 12, e.g., the transmission of user data on PUR by the device 12. The node 10 further includes a transmitting module 84 that is configured to transmit return signaling for the device 12, in response to the UL transmission. The return signaling indicates a TA update for the device 12. For example, the signaling explicitly or implicitly indicates an adjustment to the current TA stored in the device 12 or indicates that no adjustment is needed (which can be viewed as receiving an updated TA of the same value as the current TA).

Still further, the node 10 includes a refreshing module 86 that is configured to refresh a timer/counter maintained by the node 10, the refresh being responsive to the node 10 sending the TA update. The timer/counter maintained by the node matches a like timer/counter maintained by the device 12, wherein the device 12 conditions its use of the PUR on the like timer/counter by refraining from using the PUR upon the like timer/counter reaching a defined limit. The device refreshes the like timer/counter in response to the TA update.

In the context of FIGS. 5 and 6 or elsewhere herein, the term unit may have a "conventional" meaning in the field of electronics, electrical devices and/or electronic devices. "Conventional" as used here does not mean that the functionality at issue is convention and instead means that the mechanisms for instantiating or otherwise realizing the involved units may be conventional. The unit implementation mechanism(s) include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Detailed Description

Figure 7:
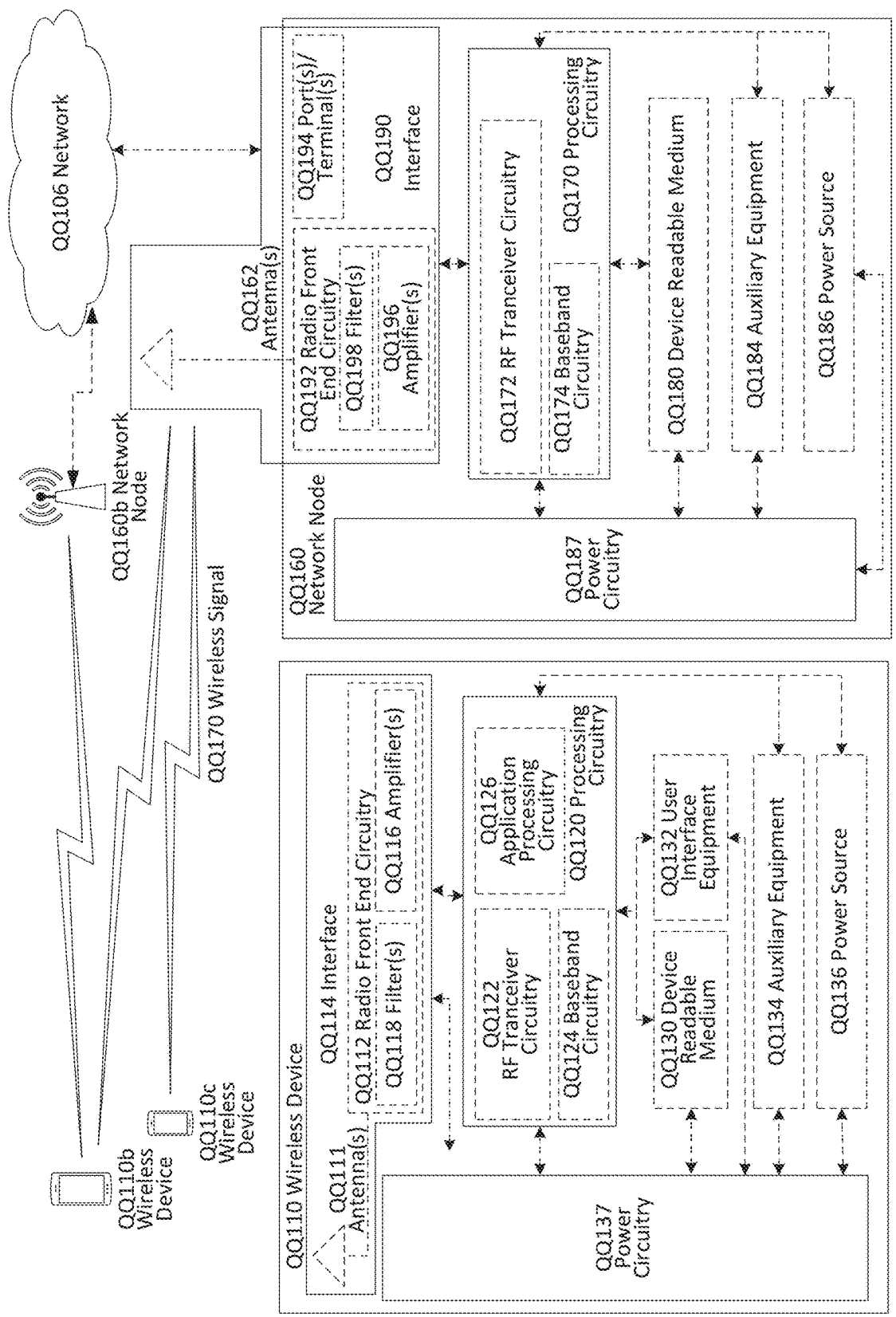
FIG. 7 is a block diagram of a wireless communication network according to some embodiments.

Although the subject matter described herein may be implemented in any appropriate type of system using any suitable components, the embodiments disclosed herein are described in relation to a wireless communication network, such as the example wireless network illustrated in FIG. 7. For simplicity, the wireless communication network (wireless network) of FIG. 7 only depicts network QQ106, network nodes QQ160 and QQ160*b*, and WDs QQ110, QQ110*b*, and QQ110*c*. In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless device's access to and/or use of the services provided by, or via, the wireless network.

The wireless network may comprise and/or interface with any type of communication, telecommunication, data, cellular, and/or radio network or another similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMAX), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below and may correspond to the above-described radio network node 10 and wireless communication device 12. The node and device components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, the term "network node" refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio.

Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDT's.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 7 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and an RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeBs. In such a scenario, each unique NodeB and RNC pair, may in some instances be considered a single separate network node. In some embodiments, network node QQ160 may be configured to support multiple radio access technologies (RATs).

In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, convening the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB, or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored, on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160 but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured, to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. QQ1 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

According to embodiments of the disclosure, and as noted above, network node QQ160 is implemented into at least two component parts: a central unit (CU), such as an LLS-CU; and one or more radio units (RUs). The CU and RU communicate with each other via a fronthaul network or interface, and particularly transmit user data messages or packets to each other over that fronthaul interface, either for transmission from the network node in the DL (i.e. from the CU to the RU) or which have been received by the network node QQ160 in the UL (i.e., from the RU to the CU).

The CU and the RU may each comprise processing circuitry which is configured to perform any of the network-side operations described herein.

As used herein, wireless communication device, also referred to as a "wireless device" or "WD," refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaining console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node.

The WD may in an example case be a machine-to-machine (M2M) device, which may in a 3GPP context be referred to as a Machine Type Communication (MTC) device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, Wi-Fi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna. QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114.

Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality.

Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips.

In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110.

For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits.

User interface equipment QQ132 is configured to allow input of information into WD QQ110 and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110.

User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein.

Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This arrangement may be, for example, for the charging of power source QQ136.

Power circuitry QQ137 may perform any formatting, converting, or other modification to the power from power source QQ136 to make the power suitable for the respective components of WD QQ110 to which power is supplied.

Figure 8:
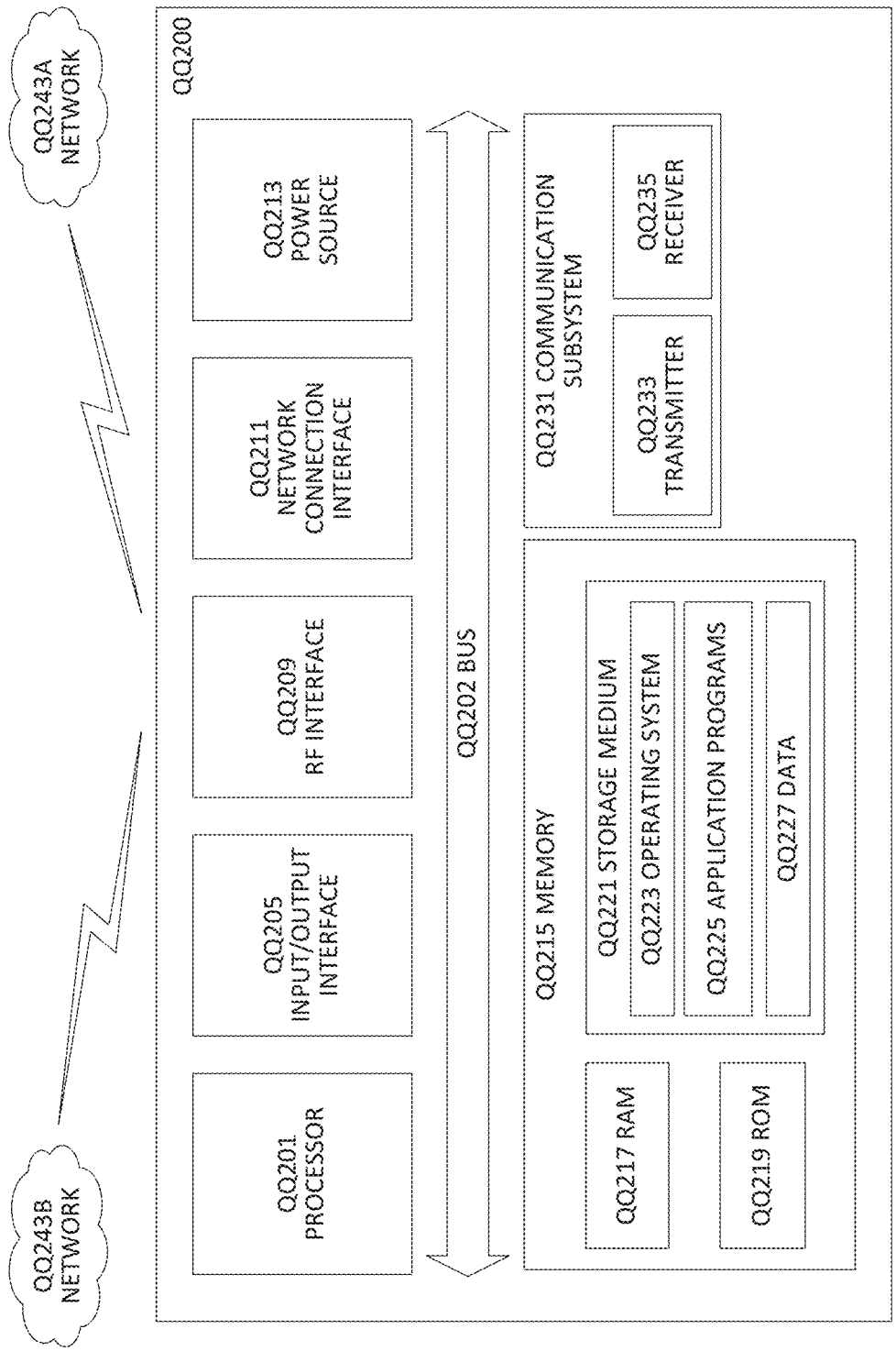
FIG. 8 is a block diagram of a user equipment according to some embodiments.

FIG. 8 illustrates one embodiment of a user equipment (UE) in accordance with various aspects described herein. As used herein, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller).

Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 8, is one example of a WD configured for communication in accordance with one or more communication standards promulgated by the 3rd. Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE, QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227.

In other embodiments, storage medium QQ221 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof.

UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like.

Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory.

Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof.

Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 8, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMAX, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein for a wireless communication device 12 may be implemented, in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein.

In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 9:
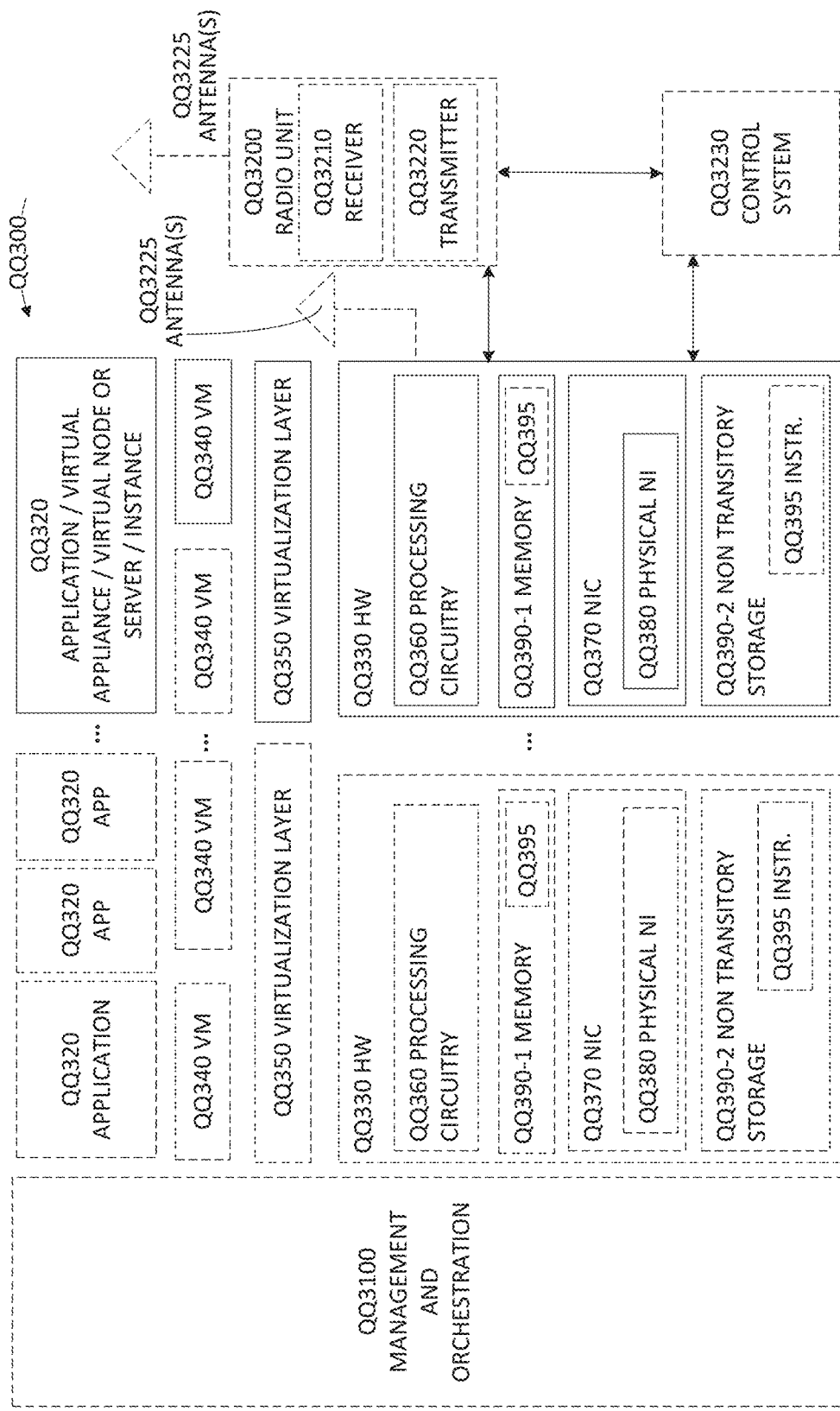
FIG. 9 is a block diagram of a virtualization environment according to some embodiments.

FIG. 9 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. QQ3, hardware QQ330 may be a standalone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 9.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 10:
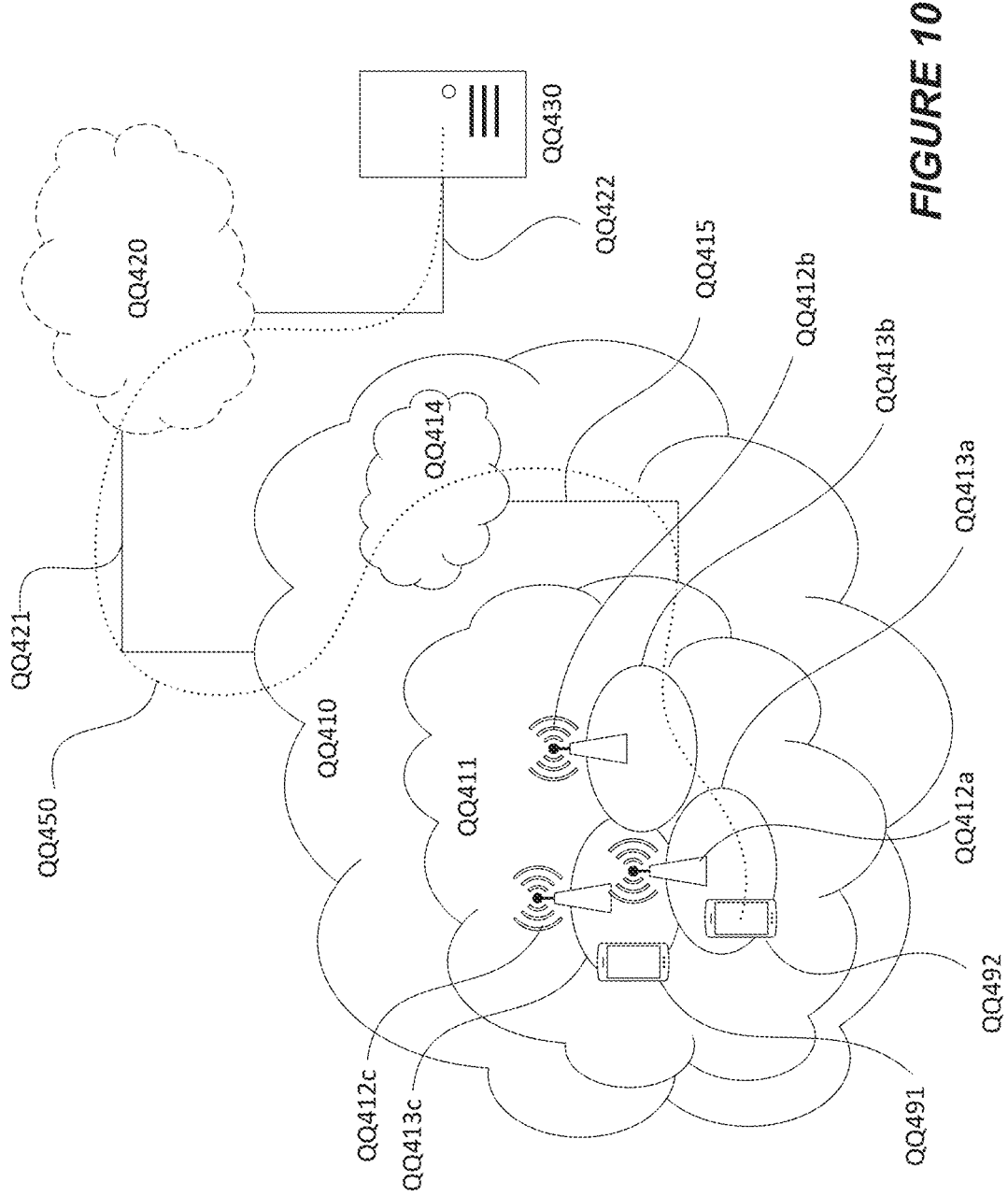
FIG. 10 is a block diagram of a communication network with a host computer according to some embodiments.

With reference to FIG. 10, in accordance with an embodiment, a communication system includes a telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second. UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 10 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via. OTT connection QQ450, using access network QQ411, core network QQ414, any intermediate network QQ420 and possible further infrastructure (not shown) as intermediaries.

OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 11. In communication system QQ500 host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities.

In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 11) served by base station QQ520. Communication interface QQ526 may be configured to facilitate connection QQ560 to host computer QQ510. Connection QQ560 may be direct or it may pass through a core network (not shown in FIG. 11) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes the UE QQ530 already referred to. Hardware QQ535 of the UE QQ530 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510.

In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 11:
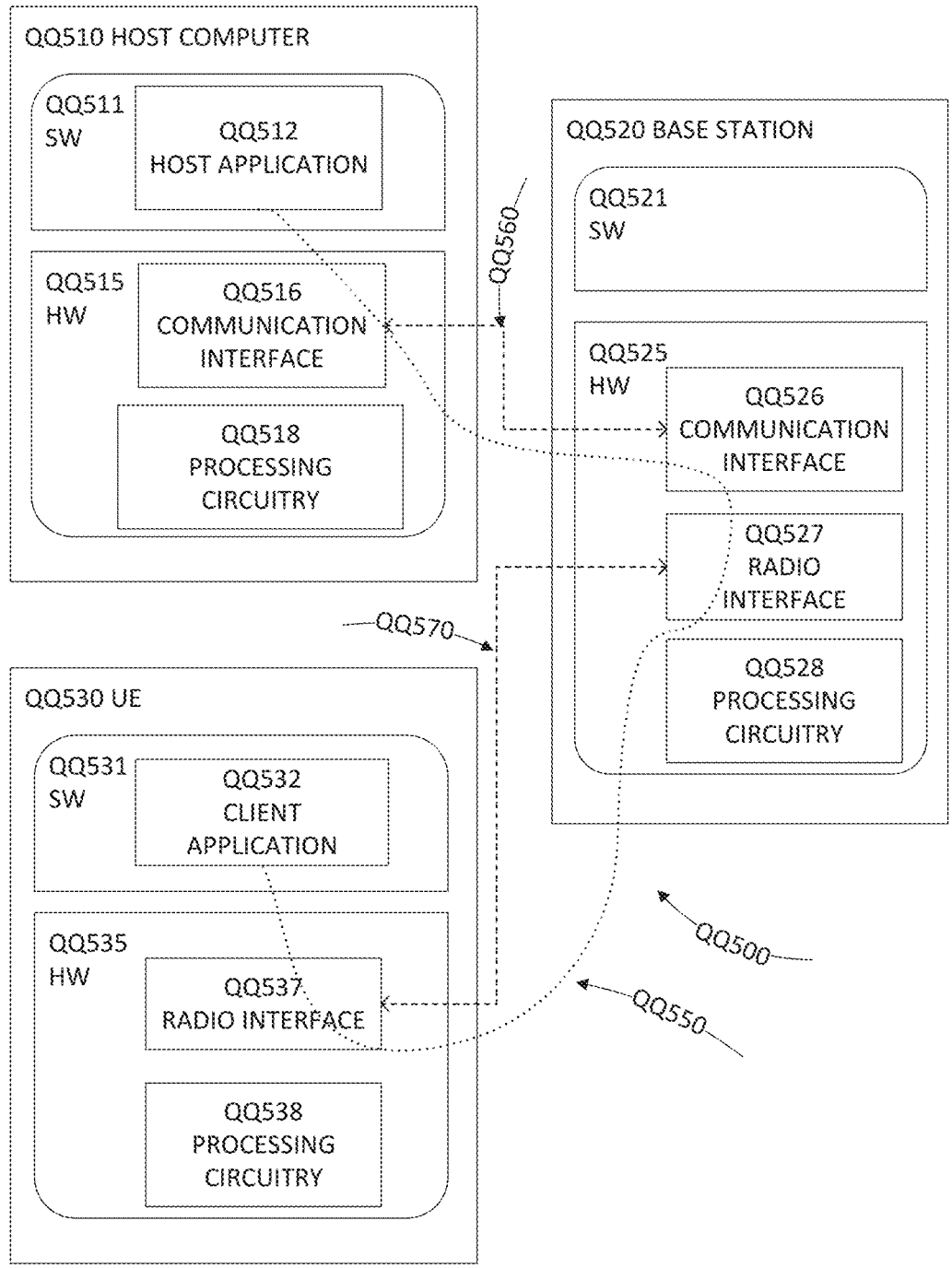
FIG. 11 is a block diagram of a host computer according to some embodiments.

It is noted that host computer QQ510, base station QQ520 and UE QQ530 illustrated in FIG. 11 may be similar or identical to host computer QQ430, one of base stations QQ412a, QQ412b, QQ412c and one of UEs QQ491, QQ492 of FIG. 10, respectively. This is to say, the inner workings of these entities may be as shown in FIG. 11 and independently, the surrounding network topology may be that of FIG. 10.

In FIG. 11, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, methods and apparatuses disclosed herein may improve the data rate and reduce the latency of user data transmitted to or from a base station and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both.

In at least one embodiment contemplated herein, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art.

In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 12:
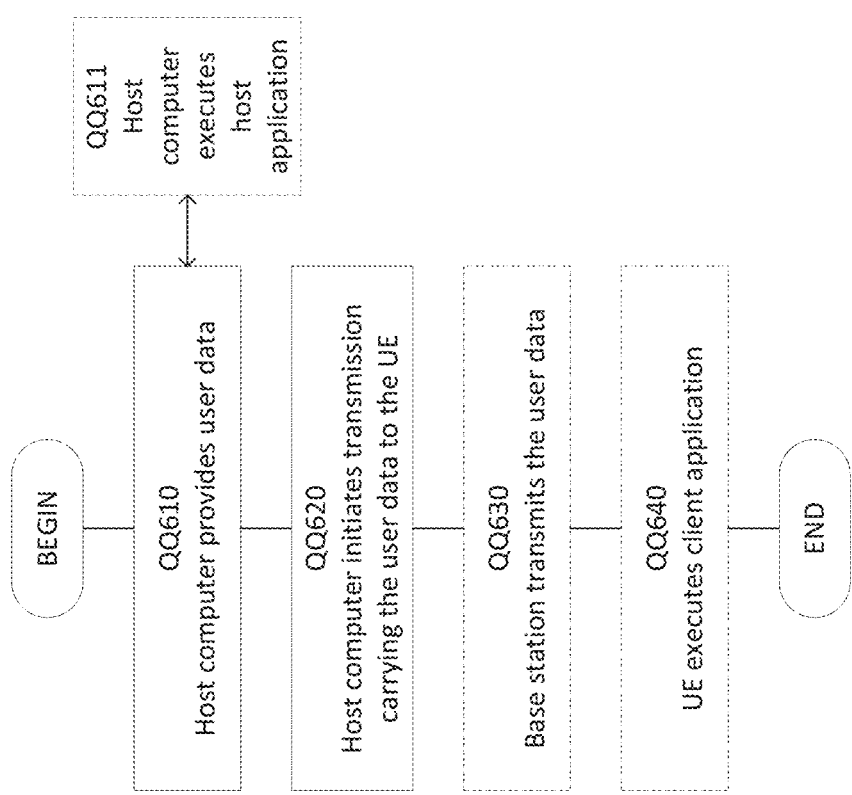
FIG. 12 is a flowchart illustrating a method implemented in a communication system, in accordance with one embodiment.

FIG. 12 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 12 will be included in this section. In step QQ610, the host computer provides user data. In sub step QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 13:
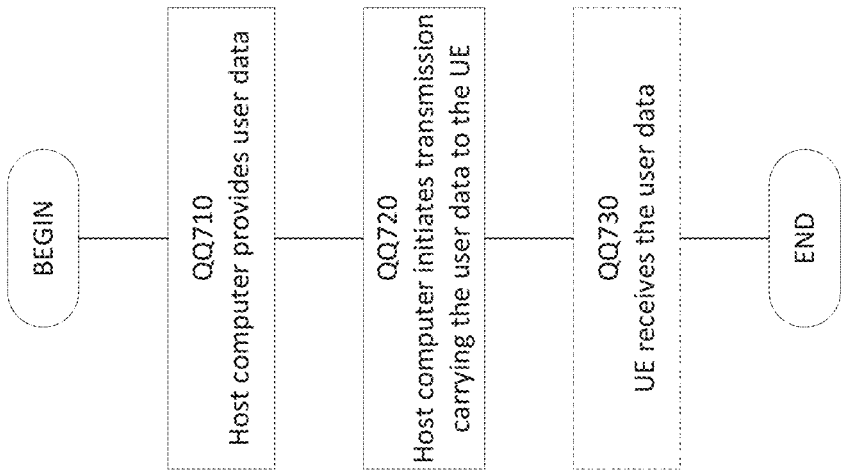
FIG. 13 is a flowchart illustrating a method implemented in a communication system, in accordance with one embodiment.

FIG. 13 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 13 will be included in this section. In step QQ710 of the method, the host computer provides user data. In an optional sub step (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

FIG. 14 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 14 will be included in this section. In step QQ810 (which may be optional), the UE receives input data provided by the host computer. Additionally or alternatively, in step QQ820, the UE provides user data. In sub step QQ821 (which may be optional) of step QQ820, the UE provides the user data by executing a client application. In sub step QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in sub step QQ830 (which may be optional), transmission of the user data to the host computer. In step QQ840 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. QQ4 and QQ5. For simplicity of the present disclosure, only drawing references to FIG. 15 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

EXAMPLE EMBODIMENTS

Group A Embodiments

1. A method performed by a wireless communication device operating in a wireless communication network, the method comprising:

performing an Uplink (UL) transmission on Preconfigured Uplink Resources (PUR), conditioned on a timer/counter maintained by the device not having reached a defined limit, wherein the device refrains from further use of the PUR upon the timer/counter reaching the defined limit;

receiving return signaling from a radio network node in response to the UL transmission; and refreshing the timer/counter responsive to the return signaling indicating a Timing Advance (TA) update for the device.

2. The method of embodiment 1, wherein refreshing the timer/counter comprises resetting the timer/counter to a starting or configured value.

3. The method of embodiment 1 or 2, wherein refreshing the timer/counter comprises refreshing the timer/counter at a defined time.

4. The method of embodiment 3, wherein the defined time is a reception time of the return signaling or corresponds to a next PUR occasion.

5. The method of any of embodiments 1-4, wherein the timer/counter is a Timing Alignment Timer (TAT) used by the device in an Idle Mode of operation to limit the length of time over which the device considers a last-received TA value to be valid.

6. The method of any of embodiments 1-4, wherein the ti is an occasion counter that counts PUR occasions.

7. The method of any of embodiments 1-6, wherein receiving the return signaling comprises receiving Layer-1 network signaling transmitted by the node, and wherein the method further comprising the device sending confirmation signaling, to confirm the refreshing of the timer/counter.

8. The method of embodiment 7, wherein sending the confirmation signaling comprises sending the confirmation signaling upon a next connection by the device to the network.

9. The method of any of embodiments 1-6, wherein receiving the return signaling comprises receiving Layer-2 or Layer-3 network signaling.

Group AA Embodiments

10. The method of any of the Group A embodiments, further comprising:
providing user data; and
forwarding the user data to a host computer via transmission to the radio network node.

Group B Embodiments

11. A method performed by a radio network node of a wireless communication network, the method comprising:

receiving an Uplink (UL) transmission on Preconfigured Uplink Resources (PUR), the UL transmission sent from a wireless communication device;

transmitting return signaling for the device in response to the UL transmission, the return signaling indicating a Timing Advance (TA) update for the device; and refreshing a timer/counter responsive to sending the TA update, the timer/counter maintained by the node and matching a like timer/counter maintained by the wireless communication device, wherein the device conditions its use of the PUR on the like timer/counter by refraining from using the PUR upon the like timer/counter reaching a defined limit, and wherein the device refreshes the like timer/counter response to the TA update.

12. The method of embodiment 11, wherein refreshing the timer/counter comprises refreshing the timer/counter at a defined time.

13. The method of embodiment 12, wherein the defined time corresponds to transmission of the return signaling or corresponds to a next PUR occasion.

14. The method of any of embodiments 11-13, wherein transmitting the return signaling comprises transmitting Layer-1 signaling and wherein the method further comprising conditioning the refreshing of the timer/counter on receiving a confirmation from the device, indicating that the device has or will refresh its like timer/counter.

15. The method of any of embodiments 11-13, wherein transmitting the return signaling comprises transmitting Layer-2 or Layer-3 network signaling.

Group BB Embodiments

16. The method of any of the Group B embodiments, further comprising the radio network node obtaining user data from the wireless communication device and forwarding the user data to a host computer, or obtaining the user data from the wireless communication device and forwarding the user data to the host computer.

Group C Embodiments

C1. A wireless communication device configured to perform any of the steps of any of the Group A embodiments.

C2. A wireless communication device comprising:
processing circuitry configured to perform any of the steps of any of the Group A embodiments; and
power supply circuitry configured to supply power to the wireless communication device.

C3. A wireless communication device comprising:
processing circuitry and memory, the memory containing instructions executable by the processing circuitry whereby the wireless communication device is configured to perform any of the steps of any of the Group A embodiments.

C4. A wireless communication device comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

C5. A computer program comprising instructions which, when executed by at least one processor of a wireless communication device, causes the wireless communication device to carry out the steps of any of the Group A embodiments.

C6. A carrier containing the computer program of embodiment C5, wherein the carrier is one of an electronic signal, optical signal, radio signal, or computer readable storage medium.

C7. A radio network node configured to perform any of the steps of any of the Group B embodiments.

C8. A radio network node comprising:
processing circuitry configured to perform any of the steps of any of the Group B embodiments;
power supply circuitry configured to supply power to the wireless communication device.

C9. A radio network node comprising:
processing circuitry and memory, the memory containing instructions executable by the processing circuitry whereby the radio network node is configured to perform any of the steps of any of the Group B embodiments.

C10. A computer program comprising instructions which, when executed by at least one processor of a radio network node, causes the radio network node to carry out the steps of any of the Group B embodiments.

C11. A carrier containing the computer program of embodiment C10, wherein the carrier is one of an electronic signal, optical signal, radio signal, or computer readable storage medium.

Group D Embodiments

D1. A communication system including a host computer comprising:
processing circuitry configured to provide user data; and
a communication interface configured to forward the user data to a wireless communication network for transmission to a wireless communication device;
wherein the wireless communication network comprises a radio network node having a radio interface and processing circuitry, the node's processing circuitry configured to perform any of the steps of any of the Group B embodiments.

D2. The communication system of the previous embodiment further including the radio network node.

D3. The communication system of the previous 2 embodiments, further including the wireless communication device, wherein the wireless communication device is configured to communicate with the radio network node.

D4. The communication system of the previous 3 embodiments, wherein:
the processing circuitry of the host computer is configured to execute a host application, thereby providing the user data; and
the wireless communication device comprises processing circuitry configured to execute a client application associated with the host application.

D5. A method implemented in a communication system including a host computer, a radio network node and a wireless communication device, such as a User Equipment (UE) or other terminal, the method comprising:
at the host computer, providing user data; and
at the host computer, initiating a transmission carrying the user data to the wireless communication device via a wireless communication network comprising the radio network node, wherein the radio network node performs any of the steps of any of the Group B embodiments.

D6. The method of the previous embodiment, further comprising, at the radio network node, transmitting the user data.

D7. The method of the previous 2 embodiments, wherein the user data is provided at the host computer by executing a host application, the method further comprising, at the wireless communication device, executing a client application associated with the host application.

D8. A wireless communication device configured to communicate with a radio network node, the wireless communication device comprising a radio interface and processing circuitry configured to perform any of the previous 3 embodiments.

D9. A communication system including a host computer comprising:
processing circuitry configured to provide user data; and
a communication interface configured to forward user data to a wireless communication network for transmission to a wireless communication device,
wherein the wireless communication device comprises a radio interface and processing circuitry, the device's components configured to perform any of the steps of any of the Group A embodiments.

D10. The communication system of the previous embodiment, wherein the wireless communication network further includes a radio network node configured to communicate with the wireless communication device.

D11. The communication system of the previous 2 embodiments, wherein:
the processing circuitry of the host computer is configured to execute a host application, thereby providing the user data; and
the device's processing circuitry is configured to execute a client application associated with the host application.

D12. A method implemented in a communication system including a host computer, a radio network node, and a wireless communication device, the method comprising:
at the host computer, providing user data; and
at the host computer, initiating a transmission carrying the user data to the device via a wireless communication network comprising the radio network node, wherein the device performs any of the steps of any of the Group A embodiments.

D13. The method of the previous embodiment, further comprising at the device, receiving the user data from the radio network node.

D14. A communication system including a host computer comprising:
communication interface configured to receive user data originating from a transmission from a wireless communication device to a radio network node,
wherein the device comprises a radio interface and processing circuitry, the device's processing circuitry configured to perform any of the steps of any of the Group A embodiments.

D15. The communication system of the previous embodiment, further including the device.

D16. The communication system of the previous 2 embodiments, further including the radio network node, wherein the radio network node comprises a radio interface configured to communicate with the wireless communication device and a communication interface configured to forward to the host computer the user data carried by a transmission from the wireless communication device to the radio network node.

D17. The communication system of the previous 3 embodiments, wherein:
the processing circuitry of the host computer is configured to execute a host application; and
the device's processing circuitry is configured to execute a client application associated with the host application, thereby providing the user data.

D18. The communication system of the previous 4 embodiments, wherein:
the processing circuitry of the host computer is configured to execute a host application, thereby providing request data; and
the device's processing circuitry is configured to execute a client application associated with the host application, thereby providing the user data in response to the request data.

D19. A method implemented in a communication system including a host computer, a radio network node, and a wireless communication device, the method comprising:
at the host computer, receiving user data transmitted to the radio network node to the wireless communication device, wherein the device performs any of the steps of any of the Group A embodiments.

D20. The method of the previous embodiment, further comprising, at the wireless communication device, providing the user data to the radio network node.

D21. The method of the previous 2 embodiments, further comprising:
at the wireless communication device, executing a client application, thereby providing the user data to be transmitted; and
at the host computer, executing a host application associated with the client application.

D22. The method of the previous 3 embodiments, further comprising;
at the wireless communication device, executing a client application; and
at the wireless communication device, receiving input data to the client application, the input data being provided at the host computer by executing a host application associated with the client application,
wherein the user data to be transmitted is provided by the client application in response to the input data.

D23. A communication system including a host computer comprising a communication interface configured to receive user data originating from a transmission from a user equipment (wireless communication device) to a radio network node, wherein the radio network node comprises a radio interface and processing circuitry, the radio network node's processing circuitry configured to perform any of the steps of any of the Group B embodiments.

D24. The communication system of the previous embodiment further including the radio network node.

D25. The communication system of the previous 2 embodiments, further including the wireless communication device, wherein the wireless communication device is configured to communicate with the radio network node.

D26. The communication system of the previous 3 embodiments, wherein:
the processing circuitry of the host computer is configured to execute a host application;

the wireless communication device is configured to execute a client application associated with the host application, thereby providing the user data to be received by the host computer.

D27. A method implemented in a communication system including a host computer, a radio network node (e.g., a base station) and a wireless communication device (e.g., a User Equipment or UE), the method comprising:
at the host computer, receiving, from the radio network node, user data originating from a transmission which the radio network node has received from the wireless communication device, wherein the wireless communication device performs any of the steps of any of the Group A embodiments.

D28. The method of the previous embodiment, further comprising at the radio network node, receiving the user data from the wireless communication device.

D29. The method of the previous 2 embodiments, further comprising at the radio network node, initiating a transmission of the received user data to the host computer.

ABBREVIATIONS

| Abbreviation | Explanation |
| --- | --- |
| 3GPP | 3rd Generation Partnership Project |
| BI | Backoff Indicator |
| BSR | Buffer Status Report |
| Cat-M1 | Category M1 |
| Cat-M2 | Category M2 |
| CE | Coverage Enhanced/Enhancement or (MAC) Control Element |
| CRC | Cyclic Redundancy Check |
| DL | Downlink |
| D-PUR | Dedicated Preconfigured Uplink Resources |
| eMTC | enhanced Machine-Type Communications |
| eNB | Evolved NodeB |
| EDT | Early Data Transmission |
| IoT | Internet of Things |
| LTE | Long-Term Evolution |
| MAC | Medium Access Control |
| NAS | Non-Access Stratum |
| NB-IoT | Narrowband Internet of Things |
| M2M | Machine-to-Machine |
| MTC | Machine-Type Communications |
| PDCCH | Physical Downlink Control Channel |
| PDU | Protocol Data Unit |
| PUR | Preconfigured Uplink Resources |
| (N)PRACH | (Narrowband) Physical Random Access Channel |
| PRB | Physical Resource Block |
| RA | Random Access |
| RAPID | Random Access Preamble IDentifier |
| RAR | Random Access Response |
| RNTI | Radio Network Temporary Identifier |
| RRC | Radio Resource Control (protocol) |
| TBS | Transport Block Size |
| UE | User Equipment |
| UL | Uplink |
| WI | Work Item |

The invention claimed is:

1. A method performed by a wireless communication device operating in a wireless communication network, the method comprising:
performing an Uplink (UL) transmission to a radio network node on Preconfigured Uplink Resources (PUR), conditioned on a counter maintained by the wireless communication device not having reached a defined limit, wherein the wireless communication device refrains from further use of the PUR upon the counter reaching the defined limit, the counter being configured to count PUR occasions;
receiving return signaling from the radio network node in response to the UL transmission, wherein the return signaling comprises Downlink Control Information (DCI), the DCI indicating a Timing Advance (TA) update; and
refreshing the counter responsive to the DCI indicating the TA update for the wireless communication device.

2. The method of claim 1, wherein refreshing the counter comprises resetting the counter to a starting or configured value.

3. The method of claim 1, wherein refreshing the counter comprises refreshing the counter at a defined time.

4. The method of claim 3, wherein the defined time is a reception time of the return signaling.

5. The method of claim 1, wherein the method further comprises the wireless communication device sending confirmation signaling, to confirm the refreshing of the counter.

6. The method of claim 5, wherein sending the confirmation signaling comprises sending the confirmation signaling upon a next connection by the wireless communication device to the wireless communication network.

7. A wireless communication device configured for operation in a wireless communication network, the wireless communication device comprising:
communication circuitry including receiver circuitry and transmitter circuitry; and
processing circuitry configured to:
perform an Uplink (UL) transmission to a radio network node, via the communication circuitry, on Preconfigured Uplink Resources (PUR), conditioned on a counter maintained by the wireless communication device not having reached a defined limit, wherein the wireless communication device refrains from further use of the PUR upon the counter reaching the defined limit, the counter being configured to count PUR occasions;
receive, via the communication circuitry, return signaling from the radio network node in response to the UL transmission, wherein the return signaling comprises Downlink Control Information (DCI), the DCI indicating a Timing Advance (TA) update; and
refresh the counter responsive to the DCI indicating the TA update for the wireless communication device.

8. The wireless communication device of claim 7, wherein the processing circuitry is configured to refresh the counter by resetting the counter to a starting or configured value.

9. The wireless communication device of claim 7, wherein the processing circuitry is configured to refresh the counter at a defined time.

10. The wireless communication device of claim 9, wherein the defined time is a reception time of the return signaling.

11. The wireless communication device of claim 7, wherein the processing circuitry is configured to send confirmation signaling to confirm the refresh of the counter.

12. The wireless communication device of claim 11, wherein the processing circuitry is configured to send the confirmation signaling upon a next connection by the wireless communication device to the wireless communication network.

13. A method performed by a radio network node of a wireless communication network, the method comprising:

receiving an Uplink (UL) transmission on Preconfigured Uplink Resources (PUR), the UL transmission sent from a wireless communication device;

transmitting return signaling for the wireless communication device in response to the UL transmission, the return signaling indicating a Timing Advance (TA) update for the wireless communication device; and refreshing a counter responsive to sending the TA update, the counter being configured to count PUR occasions, the counter maintained by the radio network node and matching a like counter maintained by the wireless communication device, wherein the wireless communication device conditions its use of the PUR on the like counter by refraining from using the PUR upon the like counter reaching a defined limit, and wherein the wireless communication device refreshes the like counter in response to the TA update.

14. The method of claim 13, wherein refreshing the counter maintained by the radio network node comprises refreshing the counter at a defined time.

15. The method of claim 14, wherein the defined time corresponds to transmission of the return signaling.

16. The method of claim 13, wherein transmitting the return signaling comprises transmitting Layer-1 signaling.

17. The method of claim 13, wherein transmitting the return signaling comprises transmitting Layer-2 and/or Layer-3 signaling.

18. The method of claim 13, wherein the method further comprises conditioning the refreshing of the counter on receiving a confirmation from the wireless communication device, indicating that the wireless communication device has or will refresh the like counter.

19. A radio network node configured for operation in a wireless communication network, the radio network node comprising:

communication circuitry comprising receiver circuitry and transmitter circuitry; and processing circuitry configured to:

receive, via the communication circuitry, an Uplink (UL) transmission on Preconfigured Uplink Resources (PUR), the UL transmission sent from a wireless communication device;

transmit, via the communication circuitry, return signaling for the wireless communication device in response to the UL transmission, the return signaling indicating a Timing Advance (TA) update for the wireless communication device; and refresh a counter responsive to sending the TA update, the counter being configured to count PUR occasions, the counter maintained by the radio network node and matching a like counter maintained by the wireless communication device, wherein the wireless communication device conditions its use of the PUR on the like counter by refraining from using the PUR upon the like counter reaching a defined limit, and wherein the wireless communication device refreshes the like counter in response to the TA update.

20. The radio network node of claim 19, wherein the processing circuitry is configured to refresh the counter maintained by the radio network node at a defined time.

21. The radio network node of claim 20, wherein the defined time corresponds to transmission of the return signaling.

22. The radio network node of claim 19, wherein the processing circuitry is configured to transmit the return signaling as Layer-1 signaling.

23. The radio network node of claim 19, wherein the processing circuitry is configured to transmit the return signaling as Layer-2 and/or Layer-3 signaling.

24. The radio network node of claim 19, wherein the processing circuitry is configured to condition the refreshing of the counter on the radio network node receiving a confirmation from the wireless communication device indicating that the wireless communication device has or will refresh the like counter.

* * * * *